United States Patent
Heilman et al.

(10) Patent No.: US 7,049,385 B2
(45) Date of Patent: May 23, 2006

(54) CURABLE THIXOTROPIC ORGANOSILOXANE COMPOSITIONS

(75) Inventors: Steven Eric Heilman, Castleton On Hudson, NY (US); Brian Patrick Bayly, Galway, NY (US)

(73) Assignee: Rhodia Inc., Cranbury, NJ (US)

( * ) Notice: Subject to any disclaimer, the term of this patent is extended or adjusted under 35 U.S.C. 154(b) by 536 days.

(21) Appl. No.: 10/364,041

(22) Filed: Feb. 11, 2003

(65) Prior Publication Data

US 2003/0155684 A1 Aug. 21, 2003

Related U.S. Application Data

(60) Provisional application No. 60/356,434, filed on Feb. 12, 2002.

(51) Int. Cl.
*B26C 33/40* (2006.01)
*C08F 283/00* (2006.01)
(52) U.S. Cl. .................. 528/20; 525/477; 264/220; 264/225
(58) Field of Classification Search ............. 264/220, 264/225; 525/477; 528/20
See application file for complete search history.

(56) References Cited

U.S. PATENT DOCUMENTS

| | | | | |
|---|---|---|---|---|
| 5,036,131 | A | | 7/1991 | Himstedt .................... 524/786 |
| 5,227,111 | A | * | 7/1993 | Brangers et al. ....... 264/211.23 |
| 5,340,897 | A | * | 8/1994 | Loiselle et al. ................ 528/17 |
| 5,442,027 | A | * | 8/1995 | Donatelli et al. ............. 528/18 |
| 5,505,997 | A | * | 4/1996 | Strong et al. ................ 427/348 |
| 5,563,210 | A | | 10/1996 | Donatelli et al. ............ 524/731 |
| 6,265,480 | B1 | * | 7/2001 | Enami et al. ................ 524/588 |

FOREIGN PATENT DOCUMENTS

SU 1502586 8/1989

* cited by examiner

*Primary Examiner*—Allan R. Kuhns

(57) ABSTRACT

The present invention relates to the use of $C_2$–$C_{24}$ aliphatic diols, preferably 1,2 propane diol as a thixotropic enhancing diluent in moisture curable organosiloxane compositions, especially in the presence of silicone-polyether block copolymer thixotropes and to the application of these compositions on vertical substrates.

29 Claims, No Drawings

CURABLE THIXOTROPIC
ORGANOSILOXANE COMPOSITIONS

This application claims the benefit of Provisional Application No. 60/356,434, filed Feb. 12, 2002.

BACKGROUND OF THE INVENTION

1. Field of the Invention

This invention relates to thixotropic organosiloxane compositions. More particularly, this invention relates to two or three part moisture curable, high viscosity organosiloxane compositions capable of being applied to vertical surfaces with negligible post-application flow. In the two part system, the catalyst portion of this invention comprising the crosslinking agent, the crosslinking catalyst, the thixotropic agent, and the thixotropic enhancing diluent is packaged separately from the base system portion, i.e., the crosslinkable polyorganosiloxane and the hydroxyl-containing filler. In the three part system, the thixotropic agent and the thixotropic enhancing diluent is packaged separately from the base and the catalyst portions: the catalyst portion being the crosslinking agent, and the crosslinking catalyst.

2. Background of the Art

In order to copy the details of shaped articles, molding composition is first applied to the surface of the object to be copied. After hardening, the composition is removed, retaining a negative copy or mold of the surface or object. Then, when a hardenable material is applied to the negative copy, a copy of the original results.

Although a wide variety of materials have been used for making molds, such as plasters, cements, and natural and synthetic polymeric compositions; for detailed and/or complicated shapes, the preferred material is silicone rubber. These organopolysiloxanes have many favorable properties for preparing negative molds including relatively high tensile strength, high tear strength, and excellent elongation properties. These properties permit silicone rubber formulations to mold complex and detailed shapes seamlessly and to be removed easily from the molded article by stretching.

Unfortunately, silicone rubber compositions are relatively difficult to apply to large vertical surfaces. Conventional silicone molding compositions typically comprise a two or three part formulation and each of these parts must be mixed together just prior to using. Next the silicone is conventionally applied to the surface of the article to be copied, usually by brushing, troweling, or spraying. To ensure that the curable silicone molding composition is in intimate contact with all of the surface features of the article to be copied, it is highly desirable that during the application processing, the initial viscosity of the composition is sufficiently low as to enable the composition to flow around, over and into the details and interstices of the surface to be copied. However, when such a low viscosity composition is applied to a vertical surface, the force of gravity causes the material to flow to such an extent that obtaining a sufficiently thick mold has proven to be exceedingly difficult.

In order to overcome this vertical run-off problem, the prior art created thioxtropic compositions that exhibit the desirable processing characteristics of having low viscosity, when subjected to high shear conditions caused with brushing, troweling or by the action of the pump and nozzle apertures at a spray head, and relatively high viscosity immediately after contact with the surface of the article to be copied; resulting in minimum running or slumping of the hardening silicone composition.

Various materials have been used to impart thixotropy to curable organosiloxane compositions.

U.S. Pat. No. 5,036,131, which issued to A. Himstedt on Jul. 30, 1991 describes silicone dispersions containing 100 parts by weight of a liquid silanol-terminated polydimethylsiloxane, a moisture activated curing agent, and finely ground alumina trihydrate. The thixotropic agent is the combination of an untreated fume silica and a liquid silanol-terminated polydiorganosiloxane containing phenylmethylsiloxane or 3,3,3-trifluoropropylsiloxane units that are incompatible with the polydimethylsiloxane. The polydiorganosiloxane reacts with the silica to form a surface that is incompatible with the polydimethylsiloxane.

Russian patent 1,502,586 issued to A. Chuiko et al. describes protective coatings containing a polymethylphenylsiloxane, toluene and a pyrogenic form of silica that has been surface-modified with methyl groups.

A disadvantage of using the incompatible filler technique described in the patents to Himstedt and Chuiko, et al. in the base portion of a two part moisture curable organosiloxane composition comprising a silane containing alkoxy or other hydrolyzable groups as the curing agent and an organotin compound as the curing catalyst is the difficulty of processing the resultant highly thixotropic material.

Other thixotropic agents that have been used in curable organosiloxane compositions include silica treated with various organosilicone compounds, chalk, dolomite, silicone polymer chains grafted with primary or secondary amine functions, and organosiloxane/oxyalkylene copolymers in combination with a filler containing hydroxyl groups.

To achieve adequate storage stability, some moisture curable organosiloxane compositions, particularly those containing tin compounds as the catalyst for the crosslinking reaction, are packaged with the tin compound and crosslinkable polyorganosiloxane in separate containers. The crosslinking agent is typically packaged together with the catalyst.

Because only a small volume of crosslinking agent relative to the volume of crosslinkable polyorganosiloxane is required to achieve the desired degree of crosslinking, the part of the composition containing the crosslinking agent typically contains a quantity of diluent that will allow this part to be blended with the part containing the crosslinkable polyorganosiloxane in a volume ratio of 1 part of curing agent portion to at least 10 parts of the portion containing the crosslinkable polyorganosiloxane. Preferably, the diluent also acts as a solvent for the crosslinking agent and the catalyst.

For some end use applications of two-part moisture curable organosiloxanes, thixotropy would be undesirable. If the thixotropic agent were in the portion of the composition containing the crosslinkable polyorganosiloxane, typically referred to as the "base" portion, a user who wished to alternate between thixotropic and non-thixotropic compositions would have to change the container of the base. If the thixotropic agent were in the crosslinking agent portion, using the conventional volume ratio of base to crosslinking agent portion of 10:1, the volume of material to be transferred during the change from a thixotropic to a non-thixotropic composition would be 1/10 of the volume to be transferred if the thixotropic agent were in the base portion.

Many diluents, however, used in the crosslinking agent portion of conventional two part moisture curable organosiloxane compositions will not dissolve the organosiloxane/oxyalkylene copolymers often used as thixotropic agents in these compositions. The resultant two-phase composition results in non-uniform curing of the composition.

Donatelli, et al. in U.S. Pat. No. 5,563,210 disclose that certain organosiloxane oligomers containing phenyl alkyl siloxane units as at least a portion of the repeating units are suitable diluents and solubilizers for the organosiloxane/oxyalkylene copolymers used as thixotropic agents for many moisture curable organosiloxane compositions. Thus, when these curing agent compositions are mixed with the base crosslinkable polyorganosiloxane composition, a homogeneous curable composition is formed.

Those skilled in the art are continually searching for more effective, less costly diluent/solubilizers for the thixotropic containing, curing agent compositions.

It is well known in the art that for some fillers, particularly reinforcing fillers such as silica, treatment of the filler to react, i.e., eliminate a portion of the hydroxyl groups present on the surface of the filler particles is often necessary to prevent a phenomenon referred to in the art as "creping" or "crepe hardening".

This is especially true with precipitated silicas. If the hydroxyl groups are left on the silica filler in the base, the composition thickens to a point wherein it becomes unworkable. Therefore, the hydroxy radicals are removed to stabilize the composition.

In view of the above, the present inventors have surprisingly discovered that, with the use of $C_2$–$C_{24}$ aliphatic diols, preferably $C_2$–$C_{12}$ aliphatic diols, and most preferably 1, 2 propane diol in lieu of the heretofore art recognized diluent additives; a most effective diluent solubilizer can be realized. Serendipitously, it has been discovered that the diols of this invention significantly enhance the thixotropic characteristics of the curable silicone composition.

SUMMARY OF THE INVENTION

This invention is based on the discovery that $C_2$–$C_{24}$ aliphatic diols, preferably $C_2$–$C_{12}$ aliphatic diols, and most preferably 1,2 propane diol are excellent thixotropic enhancing diluents in silicone curing agent compositions, especially those compositions containing silicone-polyether block copolymers with free polyether as the primary thixotropic agent for moisture curable organosiloxane compositions.

DETAILED DESCRIPTION OF THE INVENTION

This invention provides moisture curable organosiloxane compositions comprising
I. A base portion comprising
  A. a curable liquid polydiorganosiloxane containing at least two silanol or hydrolyzable groups per molecule; and
  B. a filler containing hydroxyl groups.
II. A curing agent portion comprising
  C. an amount of crosslinking agent sufficient to crosslink said composition in the presence of moisture of an organosilicone compound containing at least three silicone-bonded hydrolyzable groups per molecule;
  D. an amount of catalyst sufficient to promote crosslinking of said composition;
  E. an amount of thixotropic agent sufficient to impart thixotropy to said composition, said thixotropic agent comprising a liquid organosiloxane copolymer thixotropic agent, said copolymer comprising a mixture of a silicone-polyether block copolymer and free polyether; and
  F. an amount of a thixotropic enhancing diluent comprising a $C_2$–$C_{24}$ diol, preferably $C_2$–$C_{12}$ aliphatic diol, and most preferably 1,2 propane diol sufficient to enhance the thixotropic effectiveness of said thixotropic agent in said composition.

The solubility of the organosiloxane copolymer, crosslinking agent, and crosslinking catalyst in the diol is typically determined at the use temperature of the curable composition, which can be 25° C. or lower.

The Moisture-Curable Polyorganosiloxane (Ingredient A)

Organosiloxane compositions suitable for use with the present combinations of thixotropic agents and thixotropic enhancing diluents cure in the presence of atmospheric moisture by the reaction of a liquid polyorganosiloxane containing at least two silanol or other hydrolyzable groups per molecule with an organosilicone compound containing at least three silicone-bonded alkoxy or other hydrolyzable groups per molecule.

The curable polyorganosiloxanes referred to in this specification as Ingredient A preferably contain two silanol groups per molecule, most preferably in the terminal positions, and can exhibit a linear or branched structure. The polyorganosiloxanes are liquids at 25° C.

The repeating units of Ingredient A can be represented by the general formula $R_b SiO_{(4-b)/2}$, where R represents an unsubstituted or substituted monovalent hydrocarbon radical and b is 1 or 2. When b is 2, the hydrocarbon radicals represented by R can be identical or different. This ingredient can contain one, two or more different types of repeating units.

Monovalent hydrocarbon radicals that can be represented by R include alkyl radicals containing from 1 to 12 or more carbon atoms, substituted alkyl such as chloromethyl and 3,3,3-trifluoropropyl, aryl radicals such as phenyl and naphthyl, alkaryl radicals such as tolyl and aralkyl radicals such as benzyl. Preferred radicals are alkyl such as methyl and ethyl, phenyl, and 3,3,3-trifluoropropyl. Most preferably b in the foregoing general formula is 2 and at least one of the R groups on each silicone atom is a methyl radical.

To achieve a useful level of tensile strength and other physical properties in the cured material, the number average molecular weight of Ingredient A should be at least about 20,000, preferably from about 25,000 to about 75,000. The viscosity of polyorganosiloxanes with number average molecular weights above about 100,000 are typically too viscous for convenient processing, particularly blending with the other ingredients of the present compositions using conventional mixing equipment.

The Hydroxyl-Containing Filler (Ingredient B)

The thixotropic character of curable compositions obtained by blending the present base and curing agent portions is believed to result from an interaction between the organosiloxane copolymer (Ingredient E); the diol (Ingredient F) and the hydroxyl-containing filler (Ingredient B) present in the base portion of the composition. Any of the known conventional hydroxyl-containing reinforcing and non-reinforcing type fillers used in curable organosiloxane compositions are suitable for this purpose.

Examples of suitable fillers include, but are not limited to, reinforcing fillers such as finely divided silica of the fumed or precipitated type, and non-reinforcing fillers such as alumina, titanium dioxide, silicates such as zirconium silicate, and calcium carbonate.

The filler or combination of fillers typically constitutes from 5 to 40 percent, preferably from 10 to about 30 percent of the weight of the base portion of the present compositions. As previously mentioned, many fillers, particularly silica reinforcing fillers must be treated to reduce the level of hydroxyl radicals present on the surface of the filler particles so as to prevent the phenomenon referred to in the art of "crepe hardening". Of course, the concentration of hydroxyl groups remaining on the surface of the particles following said treatment should be sufficient to interact with the organosiloxane copolymer thixotrope and the diol to provide the desired level of thixotropy.

The Crosslinking Agent (Ingredient C)

Crosslinking agents for the polyorganosiloxanes referred to as ingredient A of the present moisture curable compositions are typically organosilicone compounds containing an average of at least three silicone-bonded hydrolyzable groups per molecule. Preferred hydrolyzable groups are alkoxy containing from 1 to about 4 carbon atoms, carboxy containing from 2 to 4 carbon atoms, and ketoximes such as methylethylketoxime.

The crosslinking agent, referred to hereinafter as Ingredient C, can be a silane, disiloxane or a polyorganosiloxane. Silanes are generally preferred, based on their costs and availability. Preferred silanes include, but are not limited to methyltrimethoxysilane, phenyltrimethoxysilane, vinyltrimethoxysilane, methyltriethoxysilane, methyltriacetoxysilane, methyltri(methylethylketoximo) silane, alkylorthosilicates such as tetraethyl orthosilicate and condensation products of these orthosilicates, which are typically referred to as alkyl polysilicates.

The concentration of crosslinking agent should be sufficient to convert the composition to an elastomeric or resinous material exhibiting the desired physical properties in the presence of moisture. Typical moisture curable compositions contain from about 0.5 to about 6 weight percent of alkoxy or other hydrolyzable group based on the total weight of the curable composition.

The Curing Catalyst (Ingredient D)

In addition to the curable polyorganosiloxane and crosslinking agent, the curable composition includes a catalyst for the crosslinking reaction. Examples of suitable catalysts include, but are not limited to, compounds of titanium, aluminum, zirconium and tin. These catalysts promote hydrolysis of the hydrolyzable groups present on the crosslinking agent in the presence of moisture. Preferred catalysts for use with the present compositions when used for mold-making include divalent tin salts of carboxylic acids such as stannous acetate and stannous octoate and organotin compounds such as dimethyltin dineodecanoate, dibutyltin diacetate, dibutyltin dilaurate and dioctyltin diacetate. The carboxylic acid portion of these tin compounds contains from 1 to 20 carbon atoms.

In preferred curable compositions of the present invention, the concentration of catalyst is from about 0.1 to about 5 weight percent, based on the weight of the crosslinkable polyorganosiloxane (Ingredient A).

The Thixotropic Agent (Ingredient E)

The primary ingredient responsible for the thixotropic character exhibited by the present compositions is a liquid organosiloxane copolymer comprising a mixture of a silicone-polyether block copolymer and free polyether.

To achieve the desired level of thixotropy, the thixotropic agent (Ingredient E) preferably constitutes from about 0.01 to about 10 weight percent of the present compositions. The most preferred concentration of the thixotropic agent is from about 0.1 to about 8 weight percent.

The Thixotropic Enhancing Diluent (Ingredient F)

The primary purpose of the thixotropic enhancing diluent is to increase the effectiveness of the thixotropic agent.

Ingredient F, the thixotropic enhancing diluent in the instant invention, comprises a $C_2$–$C_{24}$ aliphatic diol, preferably a $C_2$–$C_{12}$ aliphatic diol and most preferably a 1,2 propane diol.

Optional Ingredients

In addition to ingredients referred to as A, B, C, D, E, and F, the present compositions can contain additional ingredients to modify the properties of the curable composition or cured materials prepared using this composition. These additional ingredients include, but are not limited to, additional liquid diluents in addition to the diol, stabilizers to inhibit degradation in the presence of heat and/or ultraviolet light, anti-oxidants, dyes, pigments and flame retardants.

Preparation and Curing of Curable Compositions

The curable compositions of this invention are prepared by blending the base portion of the composition, comprising Ingredient A and Ingredient B, with the curing agent portion containing Ingredients C, D, E and F. Alternatively, the curable compositions of this invention can be prepared by blending a base portion comprising Ingredient A and Ingredient B; a curing portion comprising Ingredient C and Ingredient D; and a thixotropic portion comprising Ingredient E (the thixotropic agent) and Ingredient F (the thixotropic enhancing diluent, i.e., the diol). Crosslinking or curing of the composition begins when Ingredients A, C and D are combined with the water present in the composition, and requires from several minutes to several hours, depending upon, for example, the relative humidity in the environment, the temperature, and the type and concentration of crosslinking catalyst.

In using the present invention, the silicone composition is applied by means of equipment that mixes the two or more components of the silicone elastomer to form an uncured silicone composition, and in the same or subsequent step, applying the silicone either from a spray gun or brushing or troweling the silicone composition onto the surface to be molded. As appropriate, mold release agents may be applied to the surface prior to the application of the silicone.

In one preferred embodiment of the invention, metering pumps are used to combine the parts of the silicone elastomer together in a mixing chamber or conduit in the appropriate ratio. The combining of these materials is done in a gas-free environment inside the mixing equipment so that no air entrainment results. The mixing equipment preferably comprises a high-viscosity mix machine. Such a machine is capable of pumping and ratio-metering the silicone components. The base and curing agent portions of a two-part curable silicone composition (for example) pass through a static mix hose wherein they are properly blended and delivered to a hand-held spray gun. One suitable high-viscosity mix machine is sold by Graco, Inc., Minneapolis, Minn., under the trade designation HYDROMATE VARIABLE RATIO PROPORTIONER, SERIES 954–864.

The properly mixed and pumped uncured silicone composition is sprayed through a hand-held high-viscosity spray gun, such as Graco's 200A gun (Graco, Inc., Minneapolis, Minn.) on which is mounted a high-viscosity silicone spray head (available from A. E. Yale Enterprises, Inc., San Diego, Calif.).

Apparatus similar to that used in spraying plaster, stucco, and other cementations type products can be used with similar effect.

It is important that the silicone is applied in such a manner that air entrainment does not result to any significant degree. Otherwise, the quality of the skin mold is decreased.

Depending on the silicone being applied and the thickness of the coating of silicone desired, a one or two coat application is used. The thickness of the uncured silicone on the surface being molded is typically between about 0.2 and about 2.0 cm., more preferably between about 0.4 and about 1.0 cm.

Optional ingredients such as pigments and dyes can be packaged in one or more portions of the present compositions, so long as these are substantially free of water.

As mentioned above, in an alternative embodiment, the thixotropic agent and/or the diol can be packaged as a third component or portion, separated from the portion containing the crosslinking agent and catalyst. This allows the user of the composition to vary the degree of thixotropy by varying the amount of thixotropic agent and diol added to the curable composition without affecting the concentration of crosslinking agent and crosslinking catalyst, which would affect the physical properties of cured materials prepared using the present compositions.

The elastomers prepared using the present compositions are suitable for use in a variety of end use applications, including sealants, coating materials and as pottants or encapsulants for electrical and electronic devices. The compositions are particularly useful for preparing molds by applying the composition onto the surface of a master to be replicated. The thixotropic nature of the present compositions allows them to be non-flowing when applied to a vertical surface while exhibiting a viscosity in the presence of shearing forces that is sufficiently low to allow the compositions to be easily brushed, troweled or sprayed using conventional equipment.

Preferred base compositions exhibit a viscosity of from about 20,000 to about 100,000 centipoise (20 to 100 Pa.s) when measured at 25° C. using a Brookfield model RV viscometer equipped with a number 6 spindle rotating at a speed of 10 revolutions per minute. These compositions, when combined with the catalyst system and thixotropic systems of the present invention, do not flow substantially prior to curing when applied as a 0.38 cm-thick layer on a vertical surface.

Preferably, the cured silicone rubbers of this invention have a Shore A Durometer hardness of between about 5 and about 50 measured according to ASTM D 2240, more preferably between about 10 and about 30.

The curable composition, in its uncured state should be sufficiently thixotropic that, when subject to the high shearing associated, for example, with the pumps and nozzles of spray systems, the viscosity is so low as to be easily sprayable without the use of unusually high pressures and, upon contact with a vertical surface target, be a relatively low slump material. That is, it should be able to hang on a vertical surface in a layer between about 0.2 cm and about 1.0 cm in thickness without substantial slumping. More preferably, a layer of at least about 0.3 cm can be formed without substantial slumping.

EXAMPLES

The following examples describe compositions containing preferred combinations of thixotropic agent and 1,2 propane diol as a thixotropic enhancing diluent for the thixotropic agent as well as comparisons illustrating the prior art. The examples should not be interpreted as limiting the invention which is defined by the accompanying claims. Unless otherwise indicated, all parts and percentages in the examples are by weight and viscosities are the values measured at 25° C.

The base portion for the curable organosiloxane compositions in all of the following examples was prepared by blending the following ingredients to homogeneity (hereinafter the "Base"):

20 parts of a trimethylsiloxy-terminated polydimethyl siloxane exhibiting a viscosity at room temperature of 50 cps;

25 parts of precipitated silica exhibiting an average particle size of 7 microns;

0.5 parts water;

56.5 parts of a silanol-terminated polydimethyl siloxane exhibiting a viscosity of 20,000 cps; and 2.5 parts of a silanol-terminated polydimethyl siloxane exhibiting a viscosity of 50 cps.

EXAMPLE I

A curing agent portion was prepared by blending the following ingredients:

36 parts of phenyl trimethoxy silane;

1.3 parts of dimethyltin dineodecanoate; and 62.7 parts of 1,2 propane diol.

Unless indicated otherwise, the curable compositions of these examples are prepared by adding one part of the curing agent portion to ten parts of the Base portion and blending this mixture in a container.

The Potlife is determined by conventional measurements on the container compositions. Potlife, with respect to on site mixed materials, generally refers to shelf-life or the length of time a material can be stored prior to application.

To determine the vertical flow of the curable compositions, that is, the distance that the curable composition moves vertically before becoming sufficiently viscous as to become non-flowing (hereinafter the "Flow"), the following test is conducted:

The flow apparatus consists of a rectangular block (8.3 inches long×2.4 inches wide×1.0 inches thick) with a circular cup of diameter 1.5 inches and a depth of 0.625 inches, with an open end on the main face of the block. At the bottom edge of the circular cup begins a ruled scale down the face of the block, measured in centimeters. An aluminum plunger fits into the back of the cup. When the plunger is fully withdrawn, the cup has a depth of 0.38 inches. When the plunger is fully inserted, it creates a flat surface with the face of the block.

With the flow apparatus in a horizontal position, an amount of sample sufficient to fill the flow apparatus cup is placed in the plunger cup. The material in the cup is leveled with a spatula, working to minimize the work/shear put into the thixotropic material. The flow apparatus is then set in a vertical position and the plunger gently inserted. This empties the cup and starts the material in vertical flow down the flat face surface alongside of the metered scale. The material is allowed to flow for 3 minutes and the distance it flows is measured on the scale.

The Shore A Durometer "24 Hour Hardness" was determined according to ASTM D 2240.

The results realized with the Base portion and the curing agent portion of this example, i.e., the phenyltrimethoxysilane ("PTMS"), the dimethyltin dineodecanoate catalyst ("Tin Catalyst"); and the 1,2 propane diol ("diol") are as follows:
Flow=3.3 cm
Potlife=60 minutes
24 Hour Hardness=12

EXAMPLE II

A curing agent portion was prepared by blending the following ingredients:
36 parts of phenyl trimethoxysilane (PTMS);
1.3 parts of dimethyltin dineodecanoate (Tin Catalyst); and
62.7 parts of a silicone-polyether block copolymer thixotropic agent having a viscosity of 1500 cps.

Tests were conducted as in Example I utilizing the Base portion and the curing agent portion of this Example II to prepare the curable compositions with the following results:
Flow=2.3 cm
Potlife=120 minutes
24 Hour Hardness=24

EXAMPLE III

A first curing agent portion was prepared by blending the following ingredients:
28 parts of PTMS;
2 parts of Tin Catalyst; and
70 parts of a dimethyl polysiloxane having a viscosity of 100 cps.

A second curing agent was prepared consisting essentially of a silicone-polyether block copolymer thixotropic agent having a viscosity of 1500 cps.

10 parts of the first curing agent, 6 parts of the second curing agent, and
100 parts of the Base portion were blended and tested as in Example I. The results were as follows:
Flow=2.9 cm
Potlife=98 minutes
24 Hour Hardness=21

EXAMPLE IV

A curing agent portion was prepared by blending the following ingredients:
28 parts of PTMS;
2 parts of Tin Catalyst; and
70 parts of a dimethyl polysiloxane having a viscosity of 100 cps.

Tests were conducted as in Example I utilizing the Base portion and the curing agent portion of this Example IV to prepare curable compositions with the following results:
Flow=Offscale (greater than 14 cm in 28 seconds)
Potlife=240 minutes
24 Hour Hardness=21

EXAMPLE V

This example is illustrative of a preferred embodiment of the instant invention. A curing agent portion was prepared by blending the following ingredients:
36 parts of PTMS;
1.3 parts of Tin Catalyst;
60.5 parts of a silicone-polyether block copolymer thixotropic agent having a viscosity of 1500 cps; and
2.2 parts of 1,2 propane diol.

Tests were conducted as in Example I utilizing the Base portion and the curing agent portion of this Example V to prepare the curable compositions with the following results:
Flow=0.9 cm
Potlife=123
24 Hour Hardness=21

This example exemplifies the outstanding processing characteristics that can be realized with the curable compositions of the instant invention. The thixotropic properties of the preferred embodiments permit the curable compositions to be easily applied to vertical surfaces with essentially no running or slumping of the composition once it is placed upon the surface. Serendipitously, these curable compositions possess excellent Potlife, a highly desirable commercial property.

Although the present invention has been described in the context of certain preferred embodiments, it is also the intent that equivalents shall be encompassed within the scope of the patent. Accordingly, the scope of the present invention should not be limited to the particular embodiments disclosed, but should instead be determined by reference to the claims that follow:

What is claimed is:

1. A moisture curable organosiloxane composition comprising:
   I. a base portion comprising:
      A. a curable liquid polydiorganosiloxane containing at least two silanol or hydrolyzable groups per molecule;
      B. a filler containing hydroxyl groups; and
   II. a curing agent portion comprising:
      C. an amount of crosslinking agent sufficient to crosslink said composition in the presence of moisture, said crosslinking agent comprising an organosilicone compound containing at least three silicone-bonded hydrolyzable groups per molecule;
      D. an amount of catalyst sufficient to promote crosslinking of said composition;
      E. an amount of thixotropic agent sufficient to impart thixotropy to said composition said thixotropic agent comprising a liquid organosiloxane copolymer, said liquid organosiloxane copolymer, comprising a mixture of a silicone-polyether block copolymer and free polyether; and
      F. an amount of thixotropic enhancing diluent, comprising a $C_2$–$C_{24}$ aliphatic diol, sufficient to enhance the thixotropic effectiveness of said thixotropic agent in said composition.

2. The moisture curable organosiloxane compositions of claim 1 wherein the diol comprises a $C_2$–$C_{12}$ aliphatic diol.

3. The moisture curable organosiloxane composition of claim 2 wherein the $C_2$–$C_{12}$ diol is 1,2 propane diol.

4. The moisture curable organosiloxane composition of claim 1 wherein the filler is silica.

5. The moisture curable organosiloxane composition of claim 1 wherein the hydroxyl groups are formed on a particle surface of the filler.

6. The moisture curable organosiloxane composition of claim 1 wherein the crosslinking agent is phenyltrimethoxysilane.

7. The moisture curable organosiloxane composition of claim 1 wherein the catalyst is dimethyltin dineodecanoate.

8. A method for preparing a silicone mold of a shaped article from a moisture curable organosiloxane composition comprising the steps of:
1. providing a base portion comprising:
   A. a curable liquid polydiorganosiloxane containing at least two silanol or hydrolyzable groups per molecule; and
   B. a filler containing hydroxyl groups; and
2. providing a curing agent portion comprising:
   C. an amount of crosslinking agent sufficient to crosslink said composition in the presence of moisture said crosslinking agent comprising an organosilicone compound containing at least three silicone-bonded hydrolyzable groups per molecule;
   D. an amount of catalyst sufficient to promote crosslinking of said composition;
   E. an amount of thixotropic agent sufficient to impart thixotropy to said composition said thixotropic agent comprising a liquid organosiloxane copolymer, said liquid organosiloxane copolymer comprising a mixture of a silicone-polyether block copolymer and free polyether; and
   F. an amount of thixotropic enhancing diluent comprising a $C_2$–$C_{24}$ aliphatic diol sufficient to enhance the thixotropic effectiveness of said thixotropic agent in said composition;
3. mixing the base portion and the curing agent portion to form the moisture curable organosiloxane composition;
4. applying said moisture curable organosiloxane composition to a surface of the shaped article; and
5. curing said organosiloxane composition on said surface to form a mold of said surface.

9. A method for preparing a silicone mold of a shaped article from a moisture curable organosiloxane composition comprising the steps of:
1. providing a base portion comprising:
   A. a curable liquid polydiorganosiloxane containing at least two silanol or hydrolyzable groups per molecule; and
   B. a filler containing hydroxyl groups; and
2. providing a curing agent portion comprising:
   C. an amount of crosslinking agent sufficient to crosslink said composition in the presence of moisture said crosslinking agent comprising an organosilicone compound containing at least three silicone-bonded hydrolyzable groups per molecule;
   D. an amount of catalyst sufficient to promote crosslinking of said composition; and
3. providing a thixotropic agent portion comprising:
   E. an amount of thixotropic agent sufficient to impart thixotropy to said composition said thixotropic agent comprising a liquid organosiloxane copolymer, said liquid organosiloxane copolymer comprising a mixture of a silicone-polyether block copolymer and free polyether;
   F. an amount of thixotropic enhancing diluent comprising a $C_2$–$C_{24}$ aliphatic diol sufficient to enhance the thixotropic effectiveness of said thixotropic agent in said composition;
4. mixing the base portion; the curing agent portion; and the thixotropic agent portion to form the moisture curable organosiloxane composition;
5. applying said moisture curable organosiloxane composition to a surface of the shaped article; and
6. curing said organosiloxane composition on said surface to form a mold of said surface.

10. The method of claim 8 wherein the applying step is accomplished by spraying.

11. The method of claim 9 wherein the applying step is accomplished by spraying.

12. The method of claim 8 wherein the diol comprises $C_2$–$C_{12}$ aliphatic diol.

13. The method of claim 9 wherein the diol comprises a $C_2$–$C_{12}$ aliphatic diol.

14. The method of claim 12 wherein the $C_2$–$C_{12}$ aliphatic diol is 1,2 propane diol.

15. The method of claim 13 wherein the $C_2$–$C_{12}$ aliphatic diol is 1,2 propane diol.

16. The method of claim 8 wherein the filler is silica.

17. The method of claim 9 wherein the filler is silica.

18. The method of claim 8 wherein the hydroxyl groups are formed on a particle surface of the filler.

19. The method of claim 9 wherein the hydroxyl groups are formed on a particle surface of the filler.

20. The method of claim 8 wherein the crosslinking agent is phenyltrimethoxysilane.

21. The method of claim 9 wherein the crosslinking agent is phenyltrimethoxysilane.

22. The method of claim 8 wherein the catalyst is dimethyltin dineodecanoate.

23. The method of claim 9 wherein the catalyst is dimethyltin dineodecanoate.

24. A curing agent composition for a moisture curable organosiloxane composition having a base composition comprising a curable liquid polydiorganosiloxane containing at least two silanol or hydrolyzable groups per molecule and a filler containing hydroxyl groups, comprising:
   a). an amount of crosslinking agent sufficient to crosslink said composition in the presence of moisture said crosslinking agent comprising an organosilicone compound containing at least three silicone-bonded hydrolyzable groups per molecule;
   b). an amount of catalyst sufficient to promote crosslinking of said composition;
   c). an amount of thixotropic agent sufficient to impart thixotropy to said composition said thixotropic agent comprising a liquid organosiloxane copolymer comprising said liquid organosiloxane copolymer, a mixture of a silicone-polyether block copolymer and free polyether; and
   d). an amount of thixotropic enhancing diluent comprising a $C_2$–$C_{24}$ aliphatic diol sufficient to enhance the thixotropic effectiveness of said thixotropic agent in said composition.

25. The curing agent composition of claim 24 wherein the diol comprises a $C_2$–$C_{12}$ aliphatic diol.

26. The curing agent composition of claim 25 wherein the $C_2$–$C_{12}$ diol is 1,2 propane diol.

27. The curing agent composition of claim 24 wherein the crosslinking agent is phenyltrimethoxysilane.

28. The curing agent composition of claim 24 wherein the catalyst is dimethyltin dineodecanoate.

29. The curing agent composition of claim 24 wherein the hydroxyl groups are formed on a particle surface of the filler.

* * * * *